United States Patent Office 2,863,679
Patented Dec. 9, 1958

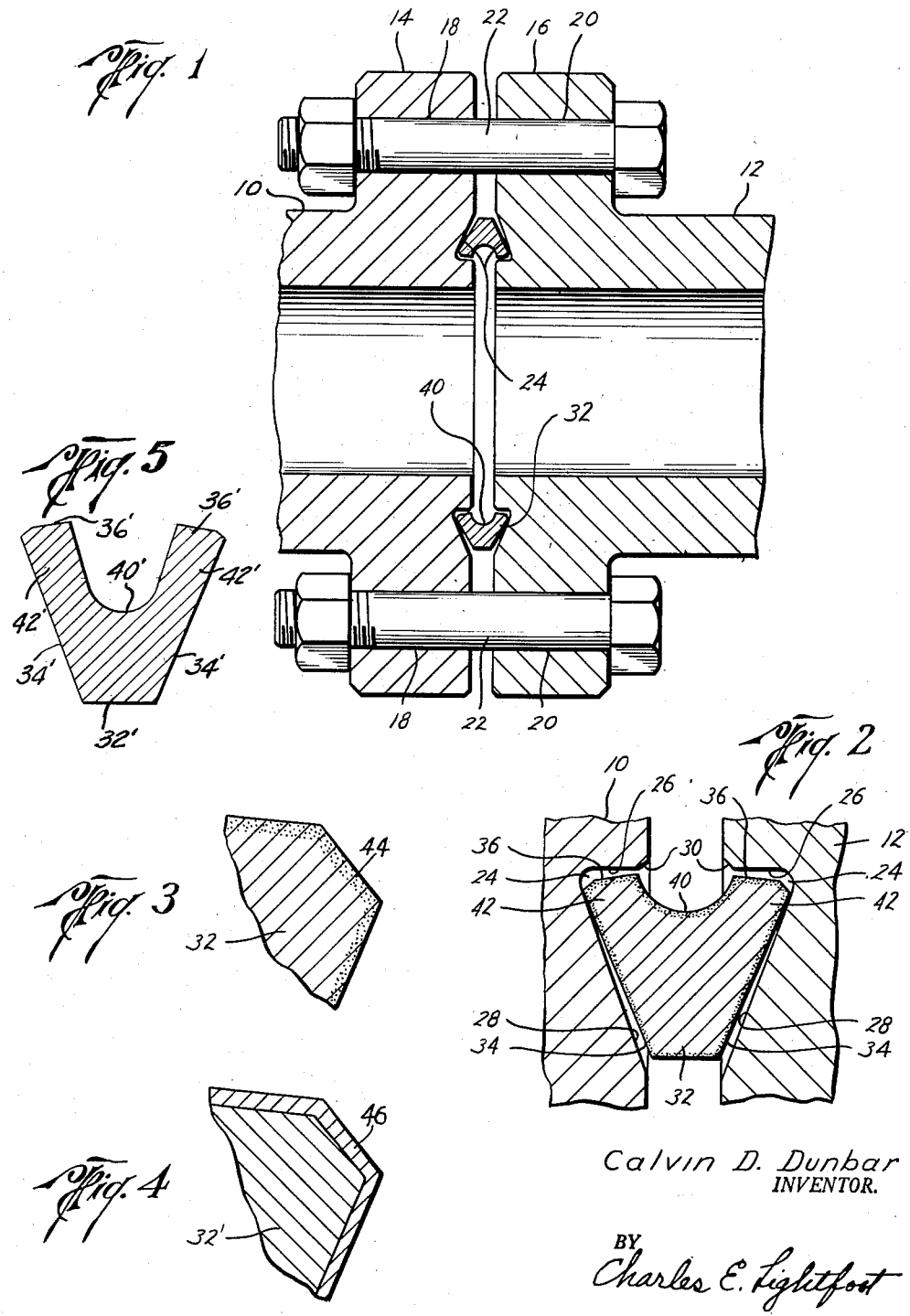

2,863,679

PIPE JOINT HAVING OPPOSED PACKING GROOVES AND SEALING MEANS THEREFOR

Calvin D. Dunbar, Houston, Tex.

Application September 10, 1954, Serial No. 455,330

2 Claims. (Cl. 285—336)

This invention relates to a pipe joint and sealing means therefor, and more particularly to a joint structure for pipes provided with external end flanges adapted to be secured together to connect the pipes in end to end relation, and having sealing means located between the adjacent pipe ends.

This application is a continuation-in-part of a copending application, Serial Number 424,102, filed by the same applicant on April 19, 1954.

In the construction of pipe lines, and particularly those for high pressure use, in which steel or other metal pipe is employed, it is often difficult to prevent leakage of the joints due to expansion and contraction of the sections of pipe under changes in temperature, such lines being frequently situated in locations in which they are subjected to relatively great temperature changes. Such lines are usually constructed of pipe sections having external annular flanges at their ends, the flanges on two adjacent ends being connected by bolts with suitable packing disposed between the pipe ends to form a sealed joint. The pipe flanges in lines constructed in this manner are usually maintained out of contact when the joints are made up in order to allow limited flexing of the line whereby the line may adjust itself to conform to irregularities without disruption of the joints, and also to permit the joint to be readily connected and disconnected and the parts to be uniformly adjusted to secure a tight seal.

Leakage of the joints in a line so constructed sometimes occurs due to extrusion of the packing, repeated expansion and contraction of the parts and slight irregularities in the fit between the parts.

The present invention has for its chief object the provision of a pipe joint whose parts are designed to cooperate to prevent the development of leaks due to repeated expansion and contraction.

Another object of the invention is to provide a pipe joint and sealing means therefor which is suitable for high or low pressure use and wherein the effectiveness of the sealing means increases in accordance with the internal pressure in the line.

A further object of the invention is the provision of a pipe joint having seal forming means which is self adjusting to maintain sealing contact between the parts when the joint is subjected to flexing.

Another object of the invention is to provide a pipe joint wherein the adjacent pipe ends are formed with annular end recesses having angularly disposed bottom walls and which are positioned to receive an annular seal forming element shaped to sealingly engage the bottom walls of the recesses and cooperable therewith upon an increase in the internal pressure in the line to increase the area of sealing contact between the pipe ends and the seal forming element.

A further object of the invention is the provision of a pipe joint wherein the adjacent pipe ends are formed with annular end recesses whose bottom walls converge radially outwardly when the joint is assembled and in which a seal forming element is provided having radially outwardly converging external faces positioned to engage said bottom walls to form a seal between the pipe ends.

A further object of the invention is to provide a seal forming element for a pipe joint of the kind referred to, which element takes the form of a ring formed of relatively hard material such as carbon steel having an external surface layer which has been decarburized to a limited depth, or which is provided with a coating of relatively soft metal, to form a seal with the adjacent pipe ends, without substantially impairing the strength and elasticity of the element.

A still further object of the invention is to provide a pipe joint of simple design and rugged construction, having seal forming means which is responsive to internal pressure within the pipe line to form a seal between the adjacent pipe ends, and whose parts are easily assembled and disassembled for the purpose of replacement or repair.

The above and other important objects and advantages of the invention will best be understood from the following detailed description, constituting a specification of the same, when considered in conjunction with the annexed drawings, wherein—

Figure 1 is a longitudinal, central, cross-sectional view of a pipe joint embodying a preferred form of the invention;

Figure 2 is a fragmentary, cross-sectional view, on an enlarged scale, of the invention as illustrated in Figure 1, showing details of construction of the parts;

Figure 3 is a fragmentary cross-sectional view, on an enlarged scale, illustrating a portion of a sealing element made in accordance with the invention and having a hardened main body or core provided with a decarburized or softened external surface layer;

Figure 4 is a view similar to that of Figure 3 showing a somewhat modified form of sealing element having a relatively hard main body or core which is provided with an external coating of softer material; and Figure 5 is a radial, cross-sectional view, on an enlarged scale, illustrating a somewhat different form of the seal forming element of the invention.

Referring now to the drawings in greater detail, the invention is illustrated in its application to a conventional type of pipe line structure employing sections of pipe 10 and 12, whose ends are provided with external annular flanges 14 and 16, having suitable perforations as indicated at 18 and 20, adapted to be positioned in registration and through which suitable fastening means, such as the bolts, indicated at 22, may be extended whereby the adjacent ends of the pipe sections may be secured together.

The end portions of the pipe sections are preferably formed of hardenable metal such as carbon steel and the end faces of the sections are each provided with an annular end recess, as indicated at 24, having an inner, annular, wall 26, extending longitudinally of the pipe, substantially parallel to the axis thereof, and a radially outwardly sloping bottom wall 28. The inner wall 26 and bottom wall 28 may be connected by a rounded corner surface at the bottom of the recess, as best seen in Figure 2, and the inner wall may be connected to the end face of the pipe section by a beveled surface 30.

A seal forming element 32 is provided for the joint which takes the form of a ring of substantially V-shape in radially cross-section, having radially outwardly converging surfaces 34, 34, which are positioned to face the bottom walls of the recesses 24, when the seal forming element is in position in the joint, as seen in Figures 1 and 2. The sealing element or ring 32 also has annular inner faces 36, 36, which are positioned in facing relation to the inner walls 26 of the recesses, and which may diverge inwardly toward the bottoms of the recesses from the inner walls thereof, in the manner best illustrated in Figure 2. The inner walls of the seal member may be connected to the outwardly converging walls 34, 34 thereof, by beveled surface portions 38, 38, and the seal ring may be formed with an inwardly opening, central, annular recess 40, defining radially inwardly diverging leg portions 42, 42, on the sealing member, which extend into the recesses 24, 24.

In assembling the parts of the pipe joint, constructed as described above, the pipe sections 10 and 12 are arranged in end-to-end relation with the flanges 14 and 16 adjacent, and the seal ring 32 positioned in the recesses 24, 24, in the manner best illustrated in Figure 2, and the flanges are connected together by the bolts 22. The bolts may then be tightened to draw the flanges toward each other, to move the outwardly converging bottom walls 28, 28 of the recesses into sealing contact with the external faces 34, 34 of the seal rings. The seal ring may have a maximum width which is greater than the combined maximum depths of the recesses 24, 24, so that the flanges 14 and 16 will be spaced apart somewhat by the seal ring, and by uniformly tightening the bolts 22 the pipe ends may be drawn securely into sealing contact with the seal ring, the inner annular recess 40 of the ring being exposed to the internal pressure in the pipe.

As seen in Figure 2 of the drawings, the external faces 34, 34 of the seal ring are preferably disposed at an angle to each other, which is somewhat greater than the angle between the bottom walls 28, 28 of the recesses so that the faces 34, 34 engage the bottom walls at locations radially inwardly of the outer periphery of the seal ring. Upon tightening of the bolts 22, it will be apparent that the pipe ends will be drawn more closely together, whereby the area of contact between the external faces 34, 34 of the seal ring and the bottom walls of the recesses will be increased, to form a more effective seal. Moreover, the inner surface of the ring is exposed to the internal pressure in the pipe, and an increase in such pressure will tend to expand the ring, thus further increasing the sealing contact between the ring and the pipe ends. The effectiveness of the seal ring is also somewhat increased by the shape of the same, the legs 42, 42 being of less thickness than the body portion of the ring, so that there is a tendency for the leg portions to more readily conform to the shape of the recesses.

Because of the construction and arrangement of the parts described above, it will be apparent that slight irregularities in the shape of the ring or in the formation of the recesses of the pipe ends is less likely to result in the development of leaks, than would be the case with parts of conventional design, and the parts may readily adjust themselves to compensate for slight differences in the tightening of the bolts 22, without substantially reducing the sealing contact between the ring and the pipe ends. Moreover, flexing of the joint may take place without substantially lessening the effectiveness of the seal. Due to the tendency of the ring 32 to expand radially outwardly in the recesses, under the influence of the internal pressure within the pipe, repeated expansion and contraction of the parts, due to substantial changes in temperature, may take place, without the development of leaks.

In pipe joints of this type, having conventional sealing means, there is frequently a tendency for the seal ring or packing element to become stuck to the pipe ends so that the ring is damaged in disassembling the parts. The diverging arrangement of the inner walls 36, 36 of the seal ring, with relation to the inner walls 26, 26 of the recesses in the present invention, provides clearance, whereby such sticking of the seal ring is effectively prevented, and the ring is free to expand or contract in the recesses, to provide an effective seal between the parts.

The pipe sections 10 and 12 and the seal ring 32, may, of course, be formed of any suitable material, but when the pipe sections are of steel or other metal, the ring may also be formed of steel or other metal, having suitable physical characteristics of strength and durability, whereby a metal to metal sealing contact of great strength and durability may be maintained. The ring and pipe sections may desirably be made of metals having somewhat different coefficients of expansion under pressure or temperature, whereby the parts will expand or contract in different degrees and may more readily adjust themselves to form a tight seal under varying temperature or pressure conditions.

As shown in Figures 2 and 3, the sealing ring may be formed of relatively hard material such as carbon steel, and may have an external surface zone or layer 44 of limited thickness which has been decarburized or otherwise softened to provide a relatively soft surface layer or bark which is capable of conforming to slight irregularities in the parts to form a more effective seal. The decarburizing or softening of the external surface zone or layer of the ring may be accomplished by packing the ring in a decarburizing substance such as iron oxide and subjecting the same to a baking operation for a predetermined time and at a controlled temperature. Such decarburization may also be carried out by heating the ring in a reducing atmosphere, such as carbon monoxide or other suitable decarburizing agent, or by other means. The softened, external surface layer 44 extends inwardly throughout a zone of sufficient thickness to enable the ring to conform to very slight irregularities in the parts to provide a fluid tight seal under high pressure conditions, a thickness of from 20 to 30 thousandths of an inch having been found to produce satisfactory results. By this means a fluid tight seal is assured without impairment of the strength and elasticity of the ring.

A further modification of the seal ring of the invention is illustrated in Figure 4, wherein the ring 32', which may be of the same configuration and formed of the same material as the ring 32 previously described, is provided with a coating of relatively soft metal, forming an external surface layer 46. The layer 46 may be applied by spraying the ring with molten metal or electroplating the same, and serves the same purpose as the softened layer 44 previously described.

In Figure 5 a somewhat modified form of sealing ring is illustrated, which is of similar construction to the ring 32, previously described, except that the leg portions 42', 42' of this form of the invention are of greater length than the legs 42, 42 of the previously described form, the recess 40' being substantially deeper than the recess 40, whereby a ring of somewhat greater internal flexibility is provided, whose inner surface is also somewhat greater so that the ring may more readily conform to the shape of the recesses of the pipe ends, and the expansive effect of the internal pressure in the pipe on the ring will be somewhat more effective. The seal ring 32' may be formed with or without a decarburized external surface zone or layer such as the zone 44 previously described in connection with the form of the invention as illustrated in Figure 3.

It will thus be seen that the invention, as described above, provides a pipe joint which is of great strength, and in which a tight seal may be maintained under adverse conditions of temperature change, vibration or flexing of the joint, and in which improved sealing contact between the parts is obtainable.

While the invention has been disclosed herein in connection with certain specific embodiments of the same, it will be understood that this is intended by way of illustration only, and that numerous changes can be made in the arrangement and shape of the various parts without departing from the spirit of the invention or the scope of the appended claims.

Having thus clearly shown and described the invention, what is claimed that is new and desired to secure by Letters Patent is:

1. The combination with pipe sections disposed in end-to-end relation and having adjacent end portions provided with annular end recesses having bottom walls which converge radially outwardly and inner annular side walls, of a seal ring positioned between said end portions and having annular surface portions facing said bottom walls and which converge radially outwardly at an angle less than the angle between said bottom walls and also having inner annular surface portions facing said side walls and which diverge radially outwardly at an angle less than the angle between the said side walls, the difference between the angle between the bottom walls and the angle between said surface portions facing said bottom walls being less than the difference between the angle between said side walls and the angle between said surface portions facing said side walls and said surface portions facing said bottom wall being engageable with the bottom walls to limit movement of said end portions toward each other.

2. The combination as claimed in claim 1, wherein the seal ring is formed with a zone of limited thickness extending inwardly from the external surface of the ring, and whose hardness is less than the hardness of the adjacent end portions of the pipe sections.

References Cited in the file of this patent

UNITED STATES PATENTS

| | | |
|---|---|---|
| 522,633 | Washburn | July 10, 1894 |
| 682,026 | Bungeroth | Sept. 3, 1901 |
| 1,825,962 | Laird | Oct. 6, 1931 |
| 1,866,160 | Griswold | July 5, 1932 |
| 1,965,273 | Wilson | July 3, 1934 |
| 2,139,413 | Kreidel | Dec. 6, 1938 |
| 2,171,217 | Kreidel | Aug. 29, 1939 |
| 2,641,381 | Bertrand | June 9, 1953 |
| 2,769,648 | Herman | Nov. 6, 1956 |

FOREIGN PATENTS

| | | |
|---|---|---|
| 448,199 | France | Nov. 20, 1912 |
| 570,093 | Germany | Feb. 11, 1933 |